United States Patent
Ugaji et al.

(10) Patent No.: US 9,059,475 B2
(45) Date of Patent: Jun. 16, 2015

(54) LITHIUM SECONDARY BATTERY

(75) Inventors: Masaya Ugaji, Kadoma (JP); Kaoru Inoue, Kadoma (JP); Takayuki Shirane, Kadoma (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 726 days.

(21) Appl. No.: 12/439,280

(22) PCT Filed: Jan. 10, 2008

(86) PCT No.: PCT/JP2008/050161
§ 371 (c)(1),
(2), (4) Date: Feb. 27, 2009

(87) PCT Pub. No.: WO2008/084818
PCT Pub. Date: Jul. 17, 2008

(65) Prior Publication Data
US 2009/0202906 A1    Aug. 13, 2009

(30) Foreign Application Priority Data
Jan. 11, 2007   (JP) ................. 2007-003006

(51) Int. Cl.
*H01M 10/052*   (2010.01)
*H01M 4/13*     (2010.01)
(Continued)

(52) U.S. Cl.
CPC ............ *H01M 10/052* (2013.01); *H01M 4/134* (2013.01); *H01M 4/1395* (2013.01);
(Continued)

(58) Field of Classification Search
CPC ... H01M 4/134; H01M 4/1395; H01M 4/485; H01M 10/44; H01M 10/052; H01M 10/0525; H01M 2004/027
USPC .............................................. 429/212, 231.95
See application file for complete search history.

(56) References Cited

U.S. PATENT DOCUMENTS

2006/0110660 A1*  5/2006  Satou et al. ............... 429/231.95
2006/0110661 A1   5/2006  Lee et al.
(Continued)

FOREIGN PATENT DOCUMENTS

JP      10-270088 A    10/1998
JP      11-233155 A    8/1999
(Continued)

OTHER PUBLICATIONS

International Search Report issued Apr. 8, 2008 in International application No. PCT/JP2008/050161, 4 pages.
(Continued)

*Primary Examiner* — Muhammad Siddiquee
(74) *Attorney, Agent, or Firm* — Brinks Gilson & Lione

(57) ABSTRACT

A negative electrode of a lithium secondary battery has a negative electrode active material including at least one element of silicon and tin. Capacities of the positive electrode and the negative electrode of the lithium secondary battery are set as follows. In a completely charged state of the lithium secondary battery charged by a predetermined charging method, the positive electrode active material and the negative electrode active material are in a first partially charged state, respectively. In a completely discharged state of the lithium secondary battery discharged by a predetermined discharging method, the negative electrode active material is in a second partially charged state.

1 Claim, 8 Drawing Sheets

(51) Int. Cl.
  *H01M 4/134* (2010.01)
  *H01M 4/1395* (2010.01)
  *H01M 4/485* (2010.01)
  *H01M 10/44* (2006.01)
  *H01M 10/0525* (2010.01)
  *H01M 4/02* (2006.01)

(52) U.S. Cl.
  CPC .......... *H01M4/485* (2013.01); *H01M 10/0525* (2013.01); *H01M 10/44* (2013.01); *H01M 2004/027* (2013.01); *Y02E 60/122* (2013.01)

(56) References Cited

U.S. PATENT DOCUMENTS

2006/0222950 A1* 10/2006 Koshina ..................... 429/231.5
2007/0207386 A1    9/2007 Konishiike et al.

FOREIGN PATENT DOCUMENTS

| JP | 2002-352852 A | 12/2002 |
| JP | 2004-87145 A | 3/2004 |
| JP | 2005-038720 A | 2/2005 |
| JP | 2006-155957 A | 6/2006 |
| JP | 2006-156330 A | 6/2006 |
| JP | 2006-196250 A | 7/2006 |
| WO | WO 2007/010922 A1 | 1/2007 |

OTHER PUBLICATIONS

Written Opinion of the International Preliminary Examining Authority issued Oct. 7, 2008 in International application No. PCT/JP2008/050161, 6 pages.

* cited by examiner

LITHIUM SECONDARY BATTERY

TECHNICAL FIELD

The present invention relates to a lithium secondary battery having an active material including at least one element of silicon and tin in a negative electrode and being excellent in the charge/discharge cycle characteristics.

BACKGROUND ART

Recently, with the development of portable devices such as personal computers and portable telephones, batteries as a power source for such devices have been increasingly demanded. The batteries used for the above-mentioned applications are required to be used at ordinary temperatures as well as to have a large energy density and excellent cycle characteristics.

In order to respond to these requirements, for both positive electrode and negative electrode, active materials having a large capacity density have been newly developed. Above all, elemental substances, alloys, or oxides of silicon (Si) or tin (Sn) that can provide an extremely large capacity density are promising materials as negative active materials.

However, in lithium secondary batteries using these negative electrode active materials, sufficient charge/discharge cycle characteristics cannot be obtained. Specifically, silicon oxide "$SiO_x$ (x=0.3)" is used as the negative electrode active material. Lithium cobaltate ($LiCoO_2$) used in a general lithium secondary battery may be used as the positive electrode active material. A mixture solution of ethylene carbonate (EC) and ethyl methyl carbonate (EMC) containing lithium hexafluorophosphate ($LiPF_6$) may be used as an electrolyte. These are used so as to produce a winding type lithium secondary battery. When this battery is charged and discharged repeatedly in the conditions of charge and discharge current of 1.0 C, charge end voltage of 4.2 V and discharge end voltage of 2.5 V, large capacity deterioration occurs at about 100 cycles.

In order to avoid the above-mentioned problem, it is preferable that the discharge electric potential at the negative electrode is made to be as low as possible. For example, Patent document 1 discloses a lithium secondary battery using silicon oxide (SiO) as a negative electrode active material in which capacity deterioration associated with the charge/discharge cycle can be suppressed by controlling the discharge end electric potential of the negative electrode to 0.6 V or less with respect to a lithium reference electrode.

However, as in Patent document 1, when the lithium reference electrode is provided in the battery in order to control the discharge electric potential of the negative electrode using SiO with respect to the lithium reference electrode, the battery configuration becomes complicated, thus making practicability thereof difficult. In other words, a battery needs to have a third electrode terminal, in addition to a positive electrode terminal and a negative electrode terminal. Furthermore, when a charge/discharge cycle is repeated from the beginning of the charge/discharge cycle with less deterioration of the positive and negative electrode active materials, electric potential ranges in which both positive and negative electrodes are used are changed according to the deterioration of active materials of the positive and negative electrodes. Therefore, even if the discharge end voltage is set so that the discharge end electric potential of the negative electrode becomes 0.6 V or less based on the positive electrode, it is difficult to determine whether or not the discharge end electric potential of the negative electrode is maintained to be 0.6 V or less. Thus, it is difficult to suppress the capacity deterioration associated with the charge/discharge cycle by measuring a battery voltage so as to detect a charge and discharged state of the negative electrode.

Patent document 1: Japanese Patent Unexarmined Publication No. H11-233155

SUMMARY OF THE INVENTION

The present invention provides a lithium secondary battery having an active material including at least one element of silicon and tin in a negative electrode and being excellent in charge/discharge cycle characteristics.

The lithium secondary battery of the present invention has a positive electrode, a negative electrode and a non-aqueous electrolyte having lithium ion conductivity and being interposed between the positive electrode and the negative electrode. The positive electrode contains positive electrode active material absorbing and releasing lithium ions. The negative electrode contains negative electrode active material including at least one element selected from a group consisting of silicon and tin. Then, in a completely charged state of the lithium secondary battery charged by a predetermined charging method, the positive electrode active material and the negative electrode active material are in a first potentially charged state, respectively. Furthermore, in a completely discharged state of a lithium secondary battery charged by a predetermined discharging method, the negative electrode active material is in a second partially charged state. Thus, by combining the charged states of the positive electrode active material and the negative electrode active material, it is possible to suppress the capacity deterioration associated with the charge/discharge cycle. Thus, a battery is designed by combining the charged state of the positive electrode active material and the charged state of the negative electrode active material, and thereby a lithium secondary battery having excellent charge/discharge cycle characteristics can be provided.

DETAILED DESCRIPTION OF THE PREFERRED EMBODIMENTS

Hereinafter, exemplary embodiments of the present invention are described with reference to drawings. Note here that the present invention is not necessarily limited to the following contents.

First Exemplary Embodiment

Figure 1:
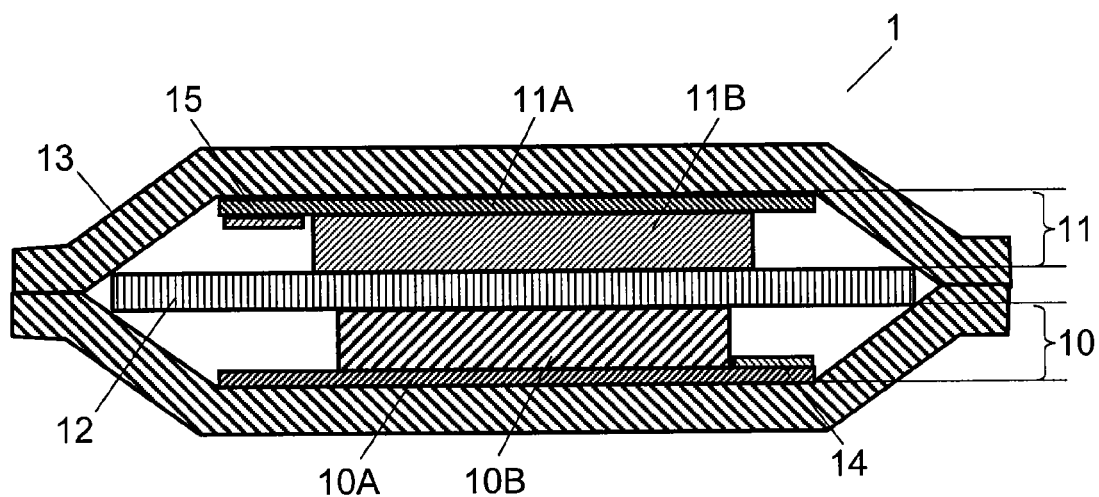
FIG. 1 is a schematic sectional view showing a lithium secondary battery in accordance with exemplary embodiments of the present invention.

FIG. 1 is a schematic sectional view showing a configuration of a laminated battery as an example of a lithium secondary battery in accordance with one exemplary embodiment of the present invention. In lithium secondary battery 1, positive electrode 10, negative electrode 11 and separator 12 intervened therebetween are laminated to each other so as to form an electrode group. This electrode group and a non-aqueous electrolyte (not shown) having lithium ion conductivity are accommodated inside outer case 13. The non-aqueous electrolyte is impregnated into separator 12 and interposed between positive electrode 10 and negative electrode 11.

Positive electrode 10 includes positive electrode current collector 10A and positive electrode active material layer 10B supported by positive electrode current collector 10A. Negative electrode 11 includes negative electrode current collector 11A and negative electrode active material layer 11B supported by negative electrode current collector 11A. Positive electrode active material layer 10B generally includes a positive electrode active material, an auxiliary conductive material and a binder. However, it may include only a positive electrode active material. Also, negative electrode active material layer 11B generally includes a negative electrode active material, an auxiliary conductive material and a binder. However, it may include only a negative electrode active material.

Positive electrode current collector 10A and negative electrode current collector 11A are coupled to one ends of positive electrode lead 14 and negative electrode lead 15, respectively. Other ends of positive electrode lead 14 and negative electrode lead 15 are drawn out of outer case 13, respectively.

Positive electrode active material layer 10B includes a positive electrode active material capable of absorbing and releasing a lithium ion. An example of such a material may include lithium cobaltate ($LiCoO_2$), lithium nickelate ($LiNiO_2$), lithium manganate ($LiMn_2O_4$), and the like. However, the material is not necessarily limited to these examples. As positive electrode current collector 10A, Al, an Al alloy, Ni, Ti, and the like, may be used.

Negative electrode active material layer 11B includes a negative electrode active material including at least one element selected from the group consisting of silicon (Si) and tin (Sn). An example of such a negative electrode active material may include an elemental substance of Si and Sn, an oxide such as $SiO_x$ ($0.05<x<1.95$) and $SnO_y$ ($0<y\leq2$), or an alloy or a compound or a solid solution obtained by substituting a part of the above-mentioned materials with at least one element selected from B, Mg, Ni, Ti, Mo, Co, Ca, Cr, Cu, Fe, Mn, Nb, Ta, V, W, Zn, C, N, and Sn, and the like. As a tin-containing material, $Ni_2Sn_4$, $Mg_2SnSiO_3$, LiSnO, and the like, may be used. These materials may be used singly or plural kinds of these materials may be used simultaneously. An example in which plural kinds of materials are used simultaneously may include a compound containing Si, oxygen and nitrogen, a composite of plurality of compounds containing Si and oxygen with constituting ratios of Si and oxygen varied, and the like. Among them, $SiO_x$ ($0.05<x<1.95$) is preferred because it is relatively low price and has high stability.

For a non-aqueous electrolyte, various lithium ion conductive solid electrolytes or non-aqueous electrolytic solutions may be used. As the non-aqueous electrolytic solution, a non-aqueous solvent dissolving lithium salt is preferably used. As the non-aqueous electrolytic solution, a solution including a well-known composition may be used and the composition is not particularly limited.

Materials of separator 12 and outer case 13 are not particularly limited and may employ materials generally used in various forms of lithium secondary batteries.

The above-mentioned positive electrode active materials hold lithium ions in the crystal structure thereof in a discharged state, and the lithium ions are released by charging. However, when the charge depth is increased and the amount of released lithium ions are increased, the crystal structure is no longer maintained. Consequently, the crystal structure is destroyed, and lithium ions are no longer absorbed and released reversibly. Therefore, in a completely charged state of lithium secondary battery 1 charged by a predetermined charging method, the capacity is controlled so that the positive electrode active material is in a first partially charged state. By controlling in this way, the capacity deterioration of the positive electrode active material associated with the charge/discharge cycle is suppressed.

Furthermore, when the above-mentioned negative electrode active material absorb lithium ions by charging and become in a highly charged state, they have difficulty in receiving lithium ions. In other words, in the highly charged state, the lithium concentration in the negative electrode active materials is increased, and the interaction between lithium becomes stronger. Therefore, the diffusion of lithium becomes slower in the negative electrode active material and, in particular, becomes in a diffusion controlled state on the surface of the negative electrode active material. Therefore, lithium ions that are not allowed to be received from a non-aqueous electrolyte into the negative electrode active material may precipitate as metallic lithium on the surface of negative electrode active material layer 11B, or if received, may be limited to a portion where lithium ions are received easily. As a result, a portion that receives lithium ions and a portion that does not receive lithium ions are mixed unevenly, whereby the composition of the negative electrode active material becomes nonuniform. When the charge/discharge cycle accompanying the production of nonunoform compositions described above is repeated, the cycle life is rapidly degraded. Therefore, in a completely charged state of lithium secondary battery 1 charged by a predetermined charging method, the capacity is controlled so that the negative electrode active material is in a first partially charged state. By controlling in this way, the capacity deterioration of the negative electrode active material associated with the charge/discharge cycle is suppressed. Thus, in a completely charged state of lithium secondary battery 1 charged by a predetermined charging method, the capacity is designed so that the positive electrode active material and the negative electrode active material are in the first partially charged state, respectively.

On the other hand, when lithium secondary battery 1 is in a completely discharged state, when the charged state of the negative electrode active material becomes too low, lithium absorbed and reduced by the negative electrode active material and the non-aqueous electrolyte react with each other, thus destroying a coating film formed on the surface of the negative electrode active material. A part of the absorbed lithium alloys and forms a skeleton structure with Si and Sn. When the charged state of the negative electrode active material becomes low and even the lithium that forms the skeleton structure at the time of discharging is taken out, the negative electrode active material is largely contracted.

In the case of an alloy of Si and Sn, a hysteresis appears. This is because a lithium-rich alloy generated at the time of charging partly remains even at the end of discharge. When the charging state of the partly remaining alloy becomes too low, lithium ions are released, thereby causing a rapid contraction.

Accordingly, the coating film is destroyed. When the coating film is destroyed, the negative electrode active material thus exposed reacts with the non-aqueous electrolyte. This reaction is a side reaction that reduces the battery capacity. When such a side reaction proceeds, the capacity is deteriorated with the advancement of charge and discharge cycles. In this exemplary embodiment, in a completely discharged state of lithium secondary battery 1 discharged by a predetermined discharging method, the capacity is designed so that the negative electrode active material is in a second partially charged state. Therefore, the destruction of the coating film is suppressed and the reaction between the negative electrode active material and the non-aqueous electrolyte is suppressed, and thus the capacity deterioration associated with the charge/discharge cycle is suppressed.

Figure 2:
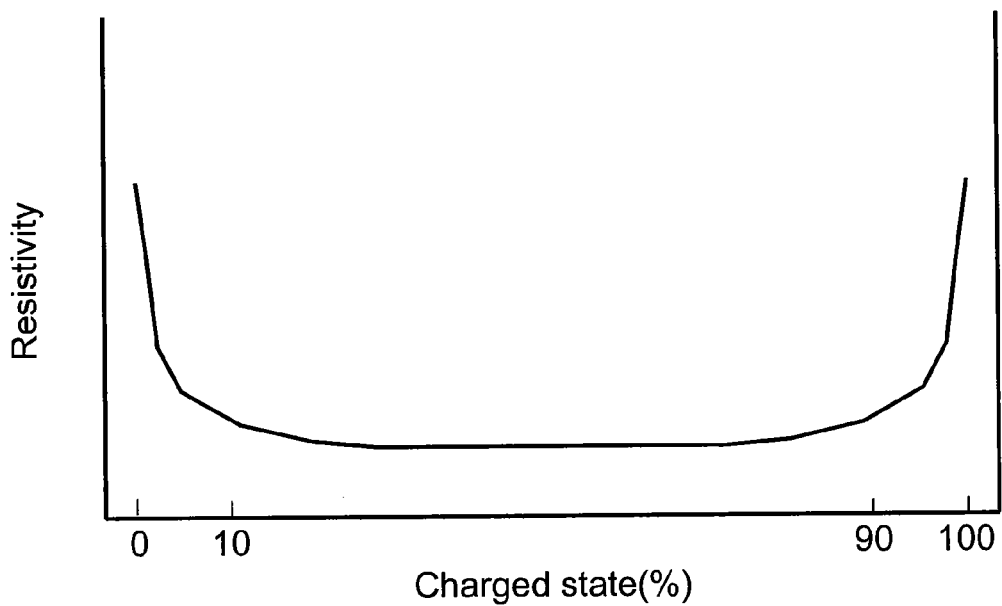
FIG. 2 is a conceptual graph showing a relation between a charged state and the resistivity in a negative electrode of a lithium secondary battery in accordance with a first exemplary embodiment of the present invention.

FIG. 2 is a conceptual graph showing a relation between a charged state and resistivity in one example of negative electrode 11 of a lithium secondary battery in accordance with the first exemplary embodiment of the present invention. In this example, $SiO_{0.3}$ is used as a negative electrode active material, but a negative electrode active material containing Si or Sn shows substantially similar tendency. When the charged state is more than 90%, the property of receiving lithium ions is lowered as mentioned above, and the resistivity is increased. On the other hand, when the charged state is less than 10% and discharging proceeds, such a large contraction that destroys the coating film occurs, thereby increasing the resistivity.

Thus, it is preferable that the charged state of the negative electrode active material is 90% or less in the completely charged state of lithium secondary battery 1. That is to say, it is preferable that the charged state of the negative electrode active material is preferably 90% or less in the first partially charged state. When the amount of lithium ions absorbed by the negative electrode active material is controlled by designing the capacity in this way, the capacity deterioration associated with charge and discharge cycles can be suppressed. That is to say, both battery capacity and charge and discharge cycle characteristics may be satisfied. In a completely charged state of lithium secondary battery 1, when the charged state of the negative electrode active material is more than 90%, as mentioned above, the precipitation of metallic lithium or nonuniform composition of the negative electrode active material remarkably occurs. Therefore, it is preferable that the charged state of the negative electrode active material is 90% or less in the first partially charged state.

Furthermore, it is preferable that the predetermined charging method for allowing lithium secondary battery 1 to be in a completely charged state may include a method of performing constant-current charging at an electric current value of 1/5 or less of the discharge capacity value of the lithium secondary battery to a predetermined charge end voltage. Even if the charge is carried out at a low rate of electric current in this way, by preventing the negative electrode active material from being charged deeply, the charged state of the negative electrode active material may be controlled reliably.

Furthermore, it is preferable that a capacity is designed in a manner that the charged state of the negative electrode active material becomes 10% or more in a completely discharged state of lithium secondary battery 1. Designing the capacity in this way may suppress the destruction of the coating film formed on the surface of the negative electrode active material. As a result, the reaction between an exposed negative electrode active material and the non-aqueous electrolyte is suppressed, and the capacity deterioration associated with a charge/discharge cycle may be suppressed. This reaction is a side reaction to reduce the battery capacity. When such a side reaction is suppressed, the capacity deterioration associated with the charge/discharge cycle may be suppressed. That is to say, both battery capacity and the charge/discharge cycle characteristics may be achieved.

Furthermore, it is preferable that the predetermined discharging method for allowing lithium secondary battery 1 to be in a completely discharged state may include a method of performing constant-current discharging at an electric current value of 1/5 or less of the value of the discharge capacity of the lithium secondary battery to a predetermined the charge end voltage. Even if discharge is carried out at a low rate of electric current in this way, by preventing the negative electrode active material from being discharged deeply, the charged state (discharged state) of the negative electrode active material may be controlled reliably.

Figure 3:
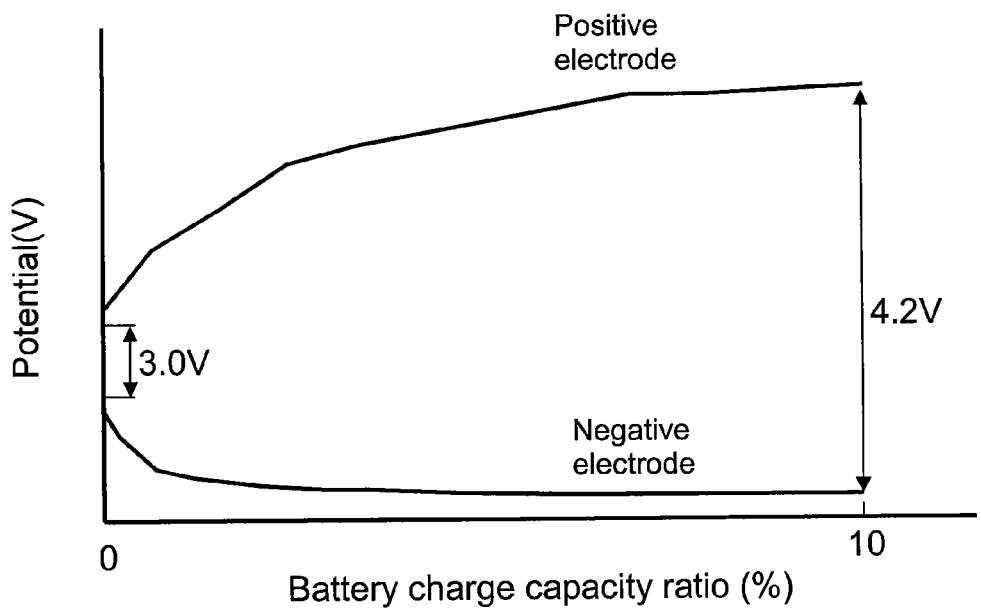
FIG. 3 is a conceptual graph showing the change in electric potentials of the positive electrode and the negative electrode during the lithium secondary battery is charged.
Figure 4:
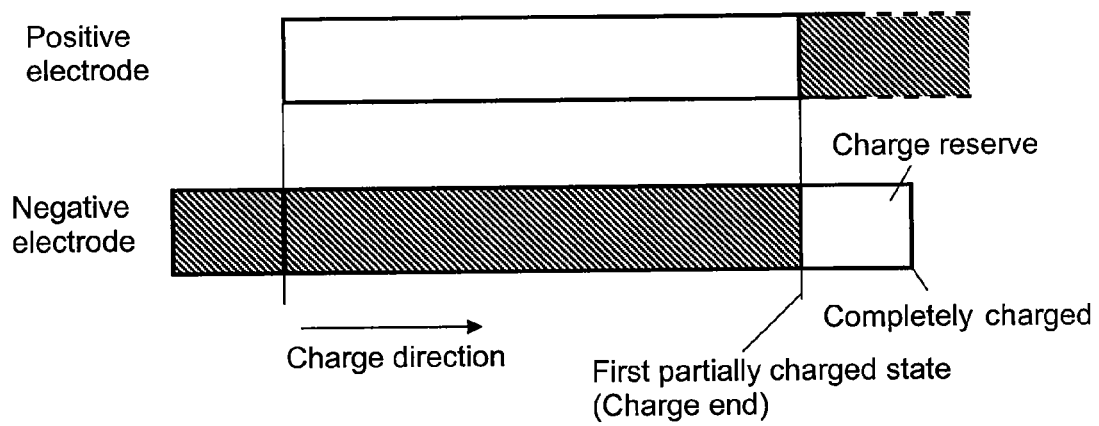
FIG. 4 is a conceptual diagram showing a presence state of lithium ions in the positive electrode and the negative electrode at a charge end point in the lithium secondary battery.
Figure 5:
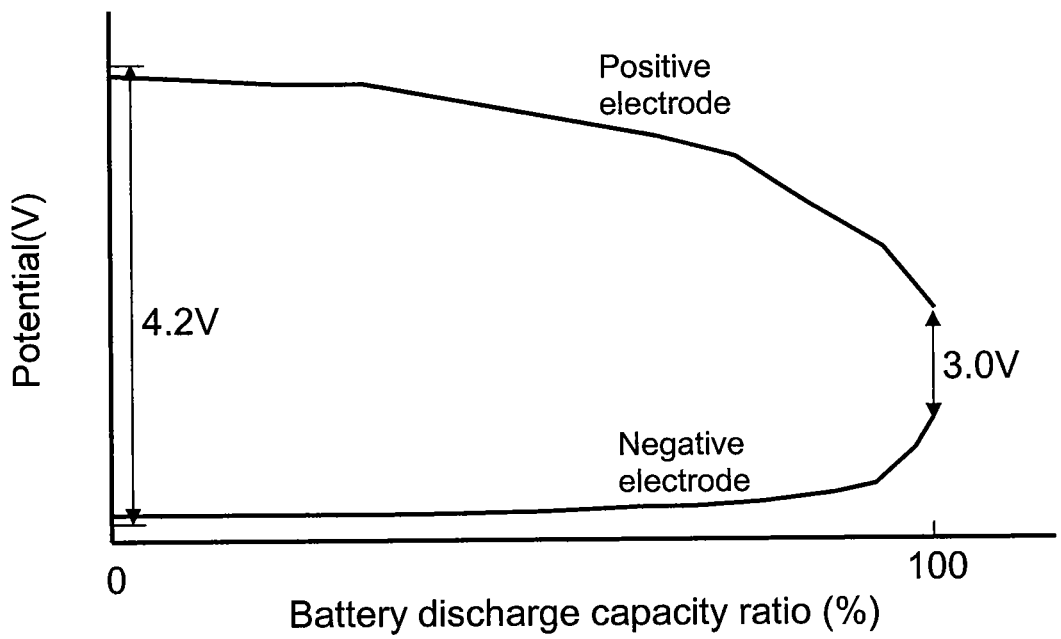
FIG. 5 is a conceptual graph showing the change in electric potentials of the positive electrode and the negative electrode during the lithium secondary battery is discharged.
Figure 6:
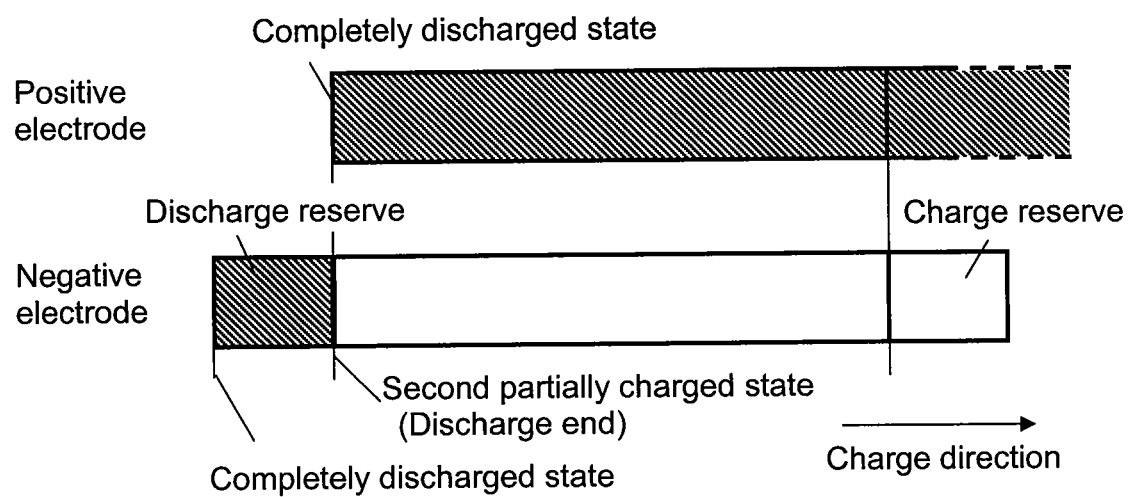
FIG. 6 is a conceptual diagram showing a presence state of lithium ions in the positive electrode and the negative electrode at a discharge end point in the lithium secondary battery.

Next, with reference to FIGS. 3 to 6, the change in the electrode potential of positive electrode 10 and negative electrode 11 in the course of charging and discharging of lithium secondary battery 1 and the presence state of lithium ions are described. FIG. 3 is a conceptual graph showing the change in the electrode potential of positive electrode 10 and negative electrode 11 when lithium secondary battery 1 in accordance with the first exemplary embodiment of the present invention is charged. FIG. 4 is a conceptual diagram showing the presence state of lithium ions in positive electrode 10 and negative electrode 11 at a charge end point in lithium secondary battery 1 in accordance with the first exemplary embodiment of the present invention. FIG. 5 is a conceptual graph showing the change in the electrode potential of positive electrode 10 and negative electrode 11 when lithium secondary battery in accordance with the first exemplary embodiment of the present invention 1 is discharged. FIG. 6 is a conceptual diagram showing the presence state of lithium ions in positive electrode 10 and negative electrode 11 at a discharge end point of lithium secondary battery 1 in accordance with the first exemplary embodiment of the present invention. Note here that in this example, the charge end voltage is made to be 4.2 V and discharge end voltage is made to be 3.0 V. In FIGS. 4 and 6, a hatched portion represents a part in which lithium ions are received and a white portion represents a part that is capable of receiving lithium ions.

Since the discharge end voltage is 3.0 V, a voltage between electrodes (potential difference) before starting charging is somewhat larger than 3.0 V as shown in FIG. 3. For example, by charging at 0.2 C (electric current of ⅕ of the discharge capacity value), the voltage between electrodes is increased. When the voltage between electrodes reaches 4.2 V, charge is terminated. At this time, as shown in FIG. 4, lithium ions released from positive electrode 10 are absorbed by negative electrode 11. Then, at the charge end point, positive electrode 10 is in the first partially charged state in which lithium ions are not completely released, and negative electrode 11 is in the first partially charged state in which it has a capability of absorbing further lithium ions. In other words, negative electrode 11 has a charge reserve that is a capacity region capable of absorbing further lithium ions. When the positive electrode active material is $LiCoO_2$, it has a composition of, for example, $Li_{0.5}CoO_2$ in the charge end state. When the negative electrode active material is $SiO_{0.3}$, it has a composition of, for example, $SiO_{0.3}Li_{4.0}$ in the charge end state.

Next, with reference to FIGS. 5 and 6, discharge of lithium secondary battery 1 is described. Since the charge end voltage is 4.2 V, the voltage between electrodes before starting discharging is somewhat smaller than 4.2 V as shown in FIG. 5. For example, by discharging at 0.2 C (electric current of ⅕ of discharge capacity value), the voltage between electrodes is reduced. When the voltage between electrodes reaches 3.0 V, discharge is terminated. At this time, as shown in FIG. 6, lithium ions released from negative electrode 11 are absorbed by positive electrode 10. Then, at the discharge end point, negative electrode 11 is in the second partially charged state in which it is able to release further lithium ions. That is to say, negative electrode 11 has a discharge reserve that is a capacity region capable of releasing further lithium ions.

FIG. 6 shows that positive electrode 10 is in a completely discharged state in which lithium ions cannot further be received, but the state is not limited to this alone. If the positive electrode active material is used until it becomes in a completely discharged state, the reaction in positive electrode 10 is a main cause to reduce a voltage, and the voltage is remarkably changed. Thus, discharge end may be detected easily. When the positive electrode active material is $LiCoO_2$, it has a composition of, for example, $LiCoO_2$ in the discharge end state. When the negative electrode active material is $SiO_{0.3}$, it has a composition of, for example, $SiO_{0.3}Li_{1.0}$ in the discharge end state.

Figure 7A:
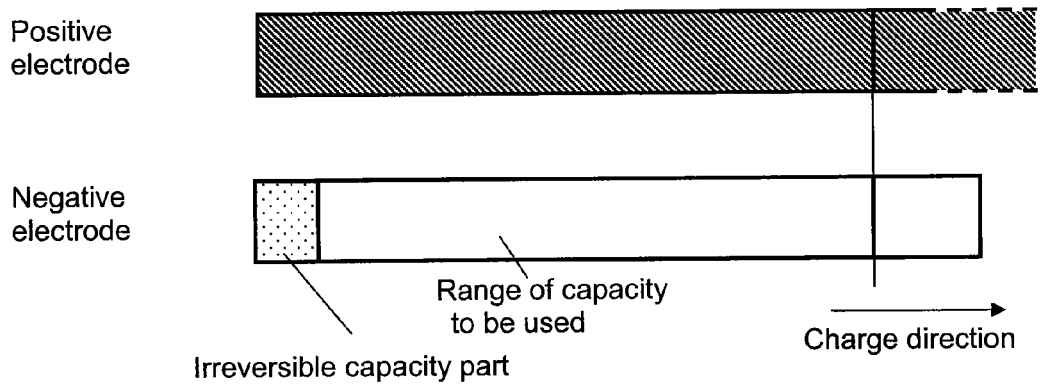
FIG. 7A is a conceptual diagram showing a presence state of lithium ions in the positive electrode and the negative electrode when the lithium secondary battery is assembled.
Figure 7B:
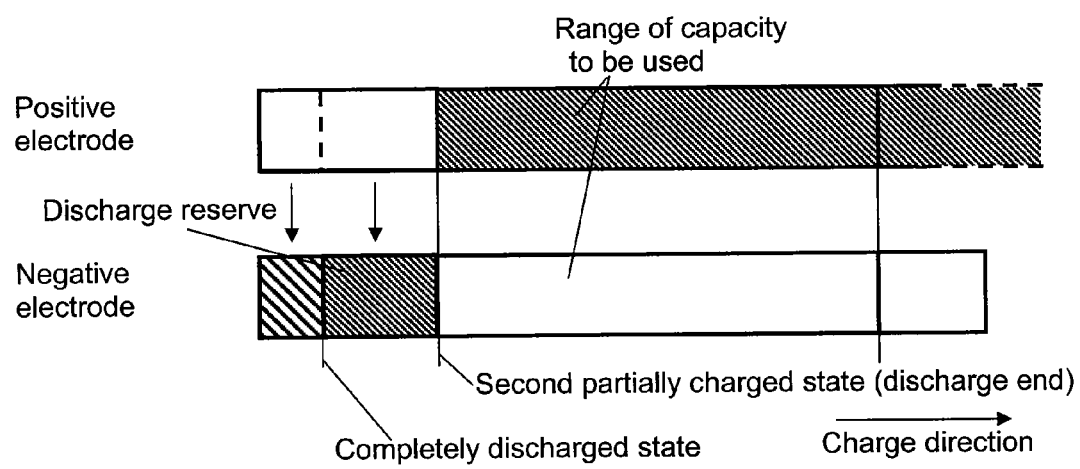
FIG. 7B is a conceptual diagram showing a presence state of lithium ions in the positive electrode and the negative electrode at a discharge end point in the lithium secondary battery.

Next, a method of setting the capacities of positive electrode 10 and negative electrode 11 in such states is described in various cases mainly with respect to the discharge side. FIGS. 7A and 7B are conceptual diagrams showing the presence state of lithium ions when positive electrode 10 in a completely discharged state of the lithium secondary battery and negative electrode 11 in a state without containing lithium ions are used in accordance with the first exemplary embodiment of the present invention. As shown in FIG. 7A, the positive electrode active material used for positive electrode 10 is generally stable, that is, in a state in which lithium ions cannot be further received when it is synthesized. On the other hand, the negative electrode active material contained in negative electrode 11 has irreversible capacity. When lithium secondary battery 1 is charged from this state, firstly, lithium ions released from positive electrode 10 are consumed so as to compensate the irreversible capacity of the negative electrode active material. Lithium ions in this part cannot be released from negative electrode 11 even if discharge is carried out. Next, lithium ions released from positive electrode 10 are absorbed by the reversible capacity part of the negative electrode active material. Then, as shown in FIG. 7B, discharge is terminated in the second partially charged state. Thus, the deactivation of the negative electrode active material may be suppressed.

Herein, even if the capacity of positive electrode 10 at the left side from the first partially charged state is larger than the total of the capacity of a range of capacity to be used and the irreversible capacity of negative electrode 11, discharge is terminated in the charged state of negative electrode 11. Therefore, a part of the filled amount of the active materials of the positive electrode 10 may be wasted. On the other hand, when the capacity of positive electrode 10 at the left side from the first partially charged state is smaller than the total of the capacity of a range of capacity to be used and the irreversible capacity of negative electrode 11, the absolute amount of lithium ions contained in lithium secondary battery 1 is reduced. Therefore, the capacities of positive electrode 10 and negative electrode 11 are set respectively in a manner that the capacity of positive electrode 10 at the left side from the first partially charged state is made to be equal to the total of the capacity of a range of capacity to be used and the irreversible capacity part of negative electrode 11.

In this case, it is preferable that the second partially charged state of the negative electrode active material is set to 10% or more with respect to the entire capacity of the negative electrode active material excluding the irreversible capacity. However, when such positive electrode 10 and negative electrode 11 are used, it is necessary to terminate discharge in a state in which positive electrode 10 has an ability to receive lithium ions. That is to say, it is necessary to terminate discharge in a state in which the battery voltage is relatively high.

Figure 8:
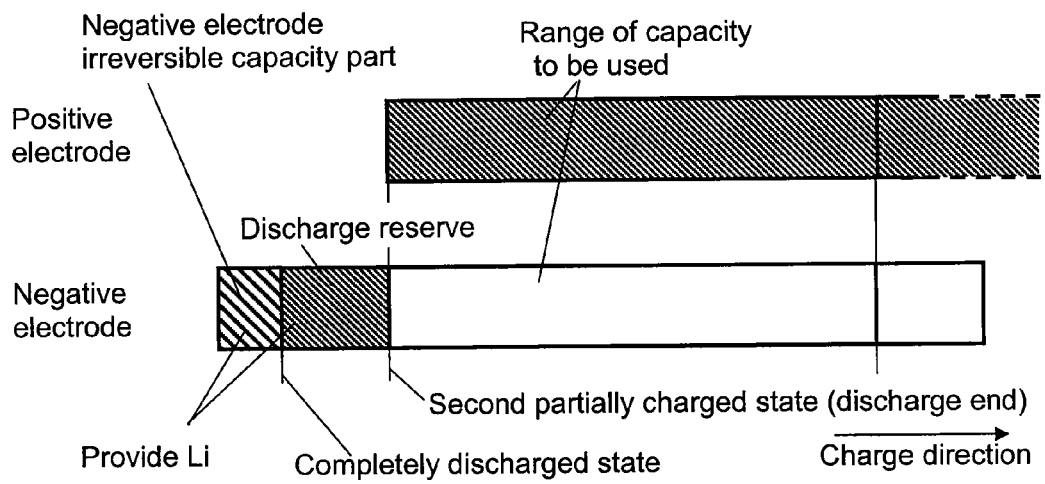
FIG. 8 is a conceptual diagram showing a presence state of lithium ions in the positive electrode and the negative electrode at a time of assembly or at a discharge end point of another lithium secondary battery in accordance with the first exemplary embodiment of the present invention.

Next, a case where negative electrode 11 is provided with an irreversible capacity of lithium in advance when the battery is assembled is described. FIG. 8 is a conceptual diagram showing presence state of lithium ions when positive electrode 10 in a completely discharged state and negative electrode 11 provided with lithium in advance are used in another lithium secondary battery in accordance with the first exemplary embodiment of the present invention. In this case, an irreversible capacity and a discharge reserve are compensated with lithium to be provided. Then, the amounts of the positive electrode active materials and the negative electrode active materials to be filled are designed in a manner that the ranges of capacity to be used of positive electrode 10 and negative electrode 11 are equal to each other. Thus, lithium secondary battery 1 excellent in the charge/discharge cycle characteristics may be produced in which the deactivation of the negative electrode active materials is suppressed while the capacity of lithium secondary battery 1 is maximized.

When the capacities of negative electrode 11 and positive electrode 10 are designed in this way, it is preferable that lithium is provided to negative electrode 11. With such a method, it is possible to control easily the combination of charged states of the negative electrode active material and the positive electrode active material and to maximize the capacity of lithium secondary battery 1.

Figure 9A:
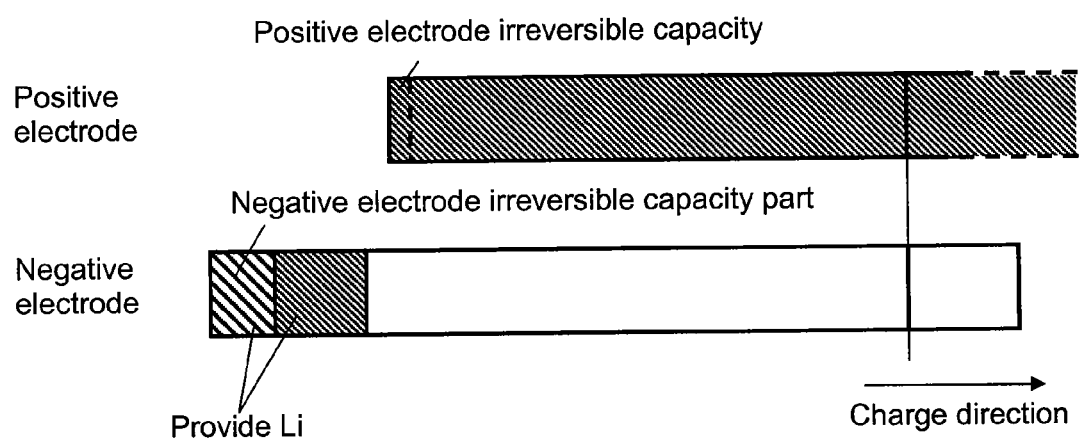
FIG. 9A is a conceptual diagram showing a presence state of lithium ions in the positive electrode and the negative electrode at a time of assembly of a further lithium secondary battery in accordance with the first exemplary embodiment of the present invention.
Figure 9B:
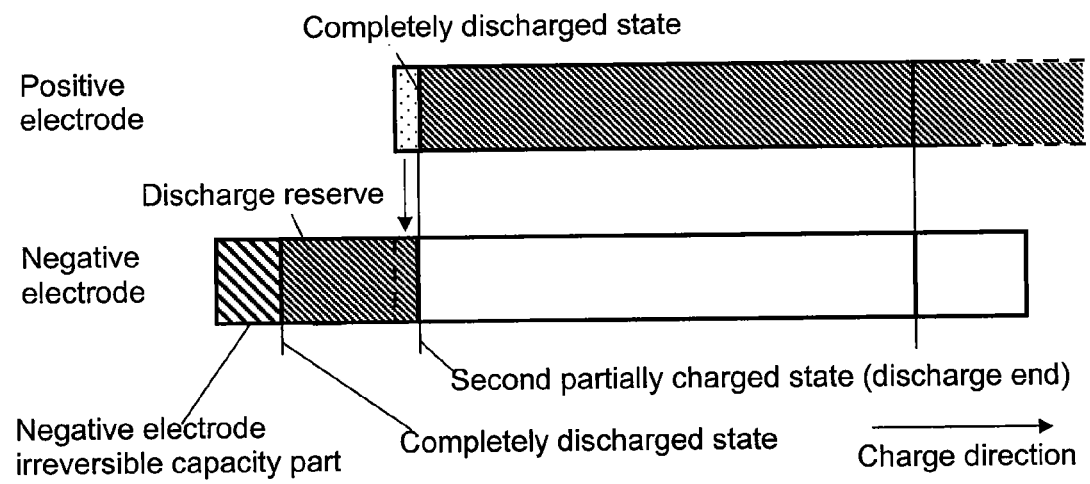
FIG. 9B is a conceptual diagram showing a presence state of lithium ions in the positive electrode and the negative electrode at a discharge end point of the further lithium secondary battery in accordance with the first exemplary embodiment of the present invention.

Next, a case where lithium of the irreversible capacity of negative electrode 11 is provided to negative electrode 11 in advance when the battery is assembled, and where positive electrode 10 also has the irreversible capacity is described. FIGS. 9A and 9B are conceptual diagrams showing the presence state of lithium ions when positive electrode 10 having irreversible capacity and negative electrode 11 provided with lithium in advance are used in still another lithium secondary battery in accordance with the first exemplary embodiment of the present invention. In this case, as shown in FIG. 9A, the amount of lithium to be provided to negative electrode 11 is made to be smaller than that in the case of FIG. 8 by an amount of the irreversible capacity. When lithium secondary battery 1 is charged from this state, lithium ions released from positive electrode 10 are absorbed by the reversible capacity of the negative electrode active materials. Then, as shown in FIG. 9B, on discharging, positive electrode 10 cannot receive further lithium ions when the irreversible capacity is remained. Then, the capacity is set in a manner that the irreversible capacity of positive electrode 10 and the lithium provided to negative electrode 11 compensate the irreversible capacity and discharge reserve of negative electrode 11. Thus, the deactivation of the negative electrode active material is suppressed.

Note that, in an alkaline storage battery using a hydrogen absorbing alloy for a negative electrode, the capacities of the positive electrode and the negative electrode are designed in a manner that a discharge reserve is provided. However, when a hydrogen absorbing alloy is used for the negative electrode, the components of the hydrogen absorbing alloy are eluted if the negative electrode is discharged excessively, so that the discharge reserve is provided. Thus, the mechanism is different from that of this exemplary embodiment.

Second Exemplary Embodiment

In this exemplary embodiment, an additive for improving the viscosity of a coating film of a negative electrode active material is added to lithium secondary battery 1. Except the additive, the configuration of the battery and idea of designing the capacity in this exemplary embodiment are substantially similar to those of the first exemplary embodiment.

As the additive, vinylene carbonate, vinyl ethylene carbonate, fluoroethylene carbonate and the like may be used singly or in combination thereof. These additives may be added to an electrolytic solution as a non-aqueous electrolyte or applied to negative electrode 11 prior to the infusion of the electrolytic solution. Since the use of such additives improves the viscosity of the coating film of the negative electrode active material, the destruction of the coating film when discharge proceeds and the charged state of the negative electrode active material is lowered is suppressed. Due to this, when the second partially charged state is made to be the same as the state before addition, the capacity deterioration of the negative electrode active material associated with charge and discharge cycles may be still more suppressed.

Furthermore, the second partially charged state may be made to 5% or less. Since the destruction of the coating film is suppressed, even if the negative electrode active material is further discharged to the completely discharged side, the capacity deterioration of the negative electrode active material associated with the charge/discharge cycle becomes the same as that before addition. Since the utilization efficiency of the negative electrode active material is improved in this way, the capacity of lithium secondary battery 1 may be increased.

In the above description, an example of the battery using plate positive electrode 10 and negative electrode 11 is described. However, the description is not limited to this example alone. It may be applied to a cylindrical or rectangular battery in which positive and negative electrodes are wound. Furthermore, it may be applied to a coin type battery in which an active material layer is formed directly to a case without using a current collector.

EXAMPLE

Figure 10:
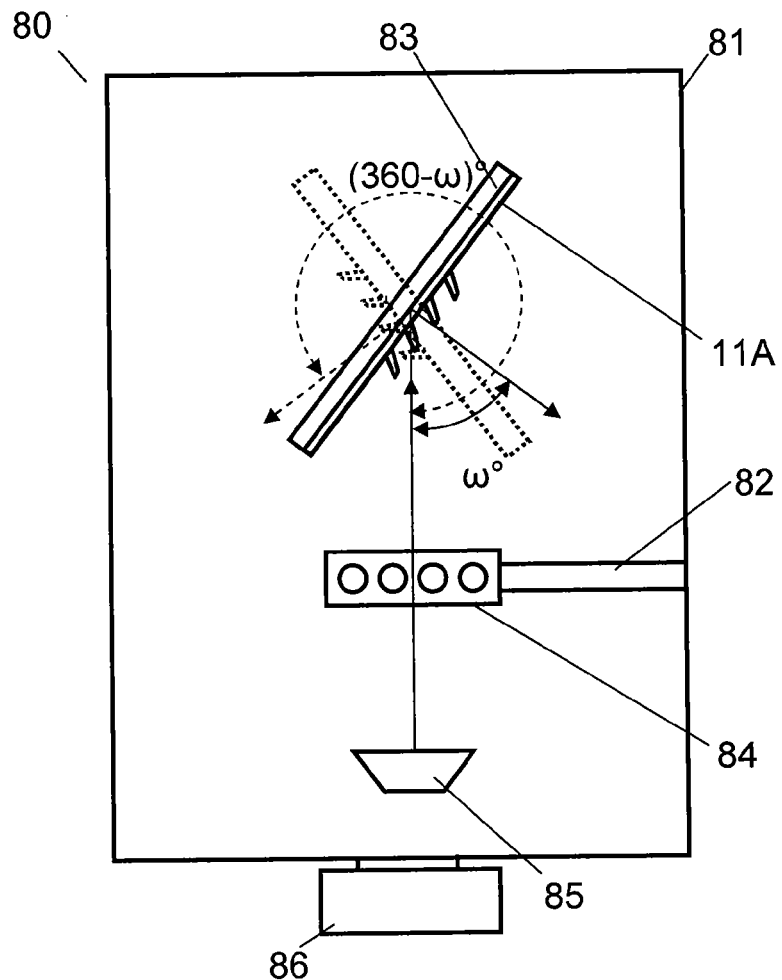
FIG. 10 is a schematic configuration view showing a manufacturing device for a non-aqueous electrolyte secondary battery in accordance with a specific example of the present invention.
Figure 11:
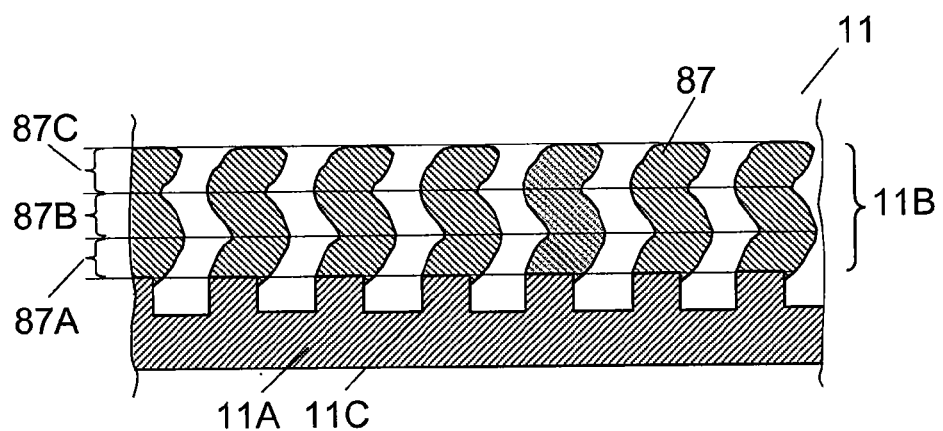
FIG. 11 is a schematic sectional view showing a negative electrode produced by using the device shown in FIG. 10.

Hereinafter, specific examples and the effects thereof are described. Firstly, a production procedure of negative electrode 11 is described. FIG. 10 is a schematic configuration view showing a manufacturing device of a negative electrode for a non-aqueous electrolyte secondary battery in the Example of the present invention. FIG. 11 is a schematic sectional view showing a negative electrode produced by using the device of FIG. 10.

Manufacturing device 80 includes: vapor deposition unit 85 for forming a columnar body by depositing, on the surface of current collector 11A, material to be vacuum-deposited; gas introducing pipe 82 for introducing oxygen into vacuum chamber 81; and fixing stand 83 for fixing current collector 11A. At the tip of gas introducing pipe 82, nozzle 84 for supplying oxygen into vacuum chamber 81 is provided. These are disposed in vacuum chamber 81. Vacuum pump 86 reduces the pressure inside vacuum chamber 81. Fixing stand 83 is disposed above nozzle 84. Vapor deposition unit 85 is disposed below perpendicular to fixing stand 83. Vapor deposition unit 85 includes an electron beam as a heating part and a crucible in which vapor deposition raw materials are disposed. In manufacturing device 80, the position relation between current collector 11A and vapor deposition unit 85 can be changed depending upon the angle of fixing stand 83.

Next, a procedure for forming a columnar body made of $SiO_x$ and having a bending point on current collector 11A is described. Firstly, 30 μm-thick band-like electrolytic copper foil is used as a base material, convex parts 11C each having a height of 7.5 μm and a width of 10 μm are formed on the surface of the base material by plating. Thus, current collector 11A on which convex parts 11C are formed in the intervals of, for example, 20 μm is prepared. Then, current collector 11A is fixed on fixing stand 83 shown in FIG. 10.

Next, fixing stand 83 is set in a manner that the normal line of current collector 11A directs at an angel of $\omega°$ (for example, 55°) with respect to the incident direction from vapor deposition unit 85. Then, for example, Si is heated by an electron beam so as to evaporate and allowed to enter the convex portion 11C of current collector 11A. At the same time, oxygen is introduced from gas introducing tube 82 and supplied from nozzle 84 to current collector 11A. That is to say, the inside of vacuum chamber 81 is made to be an atmosphere of oxygen of the pressure of, for example, 3.5 Pa. Thus, $SiO_x$, which is made by combining Si and oxygen, is deposited on convex portions 11C of current collector 11A. The columnar body portion 87A in a first stage is formed to the predetermined height (thickness). At this time, by adjusting the amount of oxygen gas to be introduced, the value x in $SiO_x$ may be controlled.

Next, as shown in a broken line of FIG. 10, fixing stand 83 is rotated so that the normal line direction of current collector 11A is located at the position of the angle $(360-\omega)°$ (for example, 305°) with respect to the incident direction from vapor deposition unit 85. Then, Si is evaporated from vapor deposition unit 85 and allowed to enter columnar body portion 87A in the first stage of current collector 11A from the direction opposite to the direction in which columnar body portion 87A extends. At the same time, oxygen is introduced from gas introducing tube 82 and supplied to current collector 11A from nozzle 84. Thus, $SiO_x$ is formed as columnar body portion 87B in a second stage to a predetermined height (thickness) on columnar body portion 87A in the first stage.

Next, fixing stand 83 is returned to an original state and columnar body portion 87C in a third stage is formed on columnar body 87B to a predetermined height (thickness). Thus, columnar body portion 87B and columnar body portion 87C are formed in a manner that their obliquely rising angles and obliquely rising directions are different from each other. Columnar body portion 87C is formed in the same direction as columnar body portion 87A. Thus, active material lump 87 including three stages of columnar body portions is formed on current collector 11A. Thus, active material layer 11B may be formed. By adjusting the amount of introduced oxygen gas in each stage, the value x in $SiO_x$ in each stage may be controlled, respectively.

In the above description, active material lump 87 including three stages of columnar body portions is described. However, in this Example, by repeating the adjustment of angles of fixing stand 83, a columnar body including 30 stages of columnar body portions is formed. The obliquely rising direction of each stage of columnar body including 30 stages can be controlled by changing angle ω of the normal direction of the surface of current collector 11A with respect to the incident direction from vapor deposition unit 85. Furthermore, the value x in $SiO_x$ of each stage can be controlled in the range from 0.1 or more and less than 2. In the below-mentioned consideration, the average value of entire active material lump 87 is defined as the value x.

Figure 12:
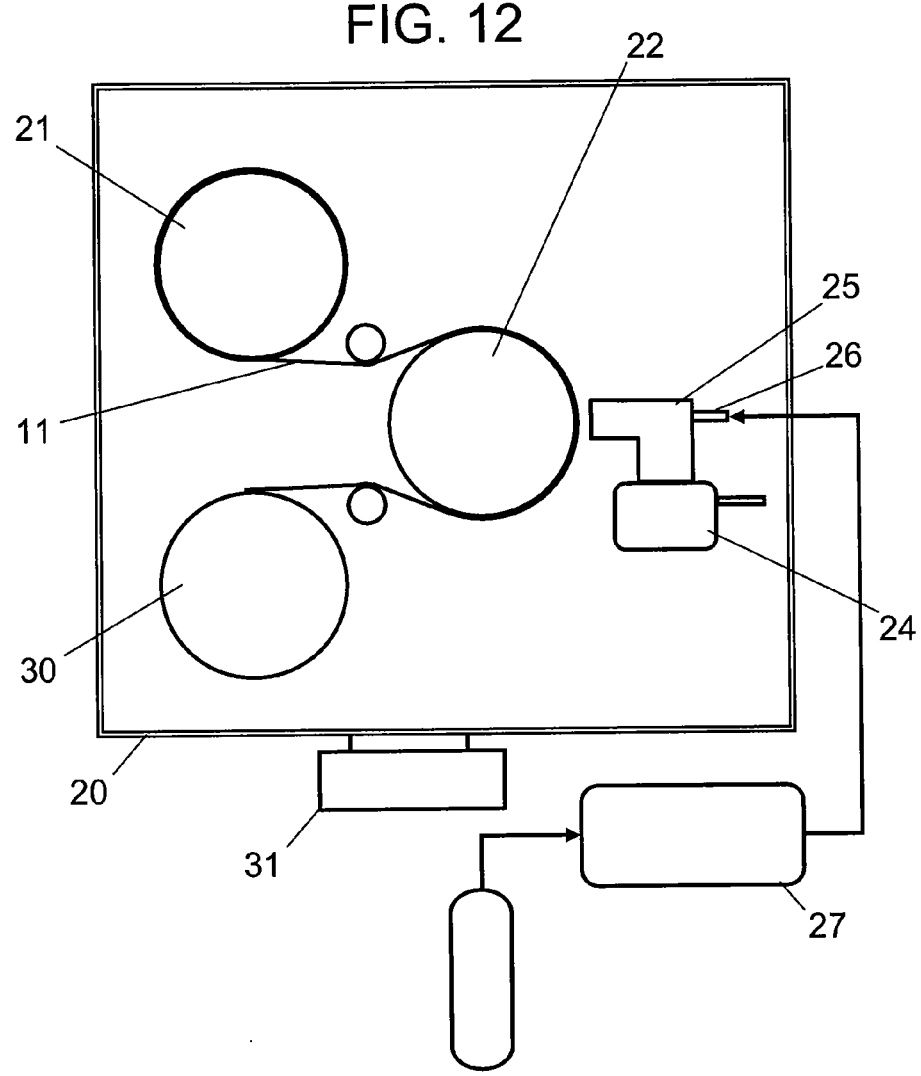
FIG. 12 is a schematic configuration view showing a vacuum evaporator for providing lithium to the negative electrode in accordance with the specific example of the present invention.
Figure 13:
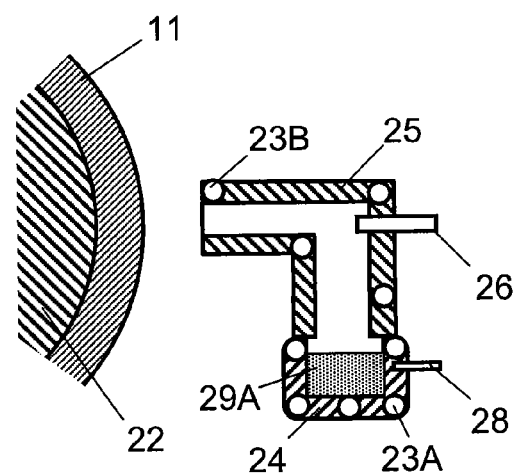
FIG. 13 is a conceptual sectional view showing a configuration of a lithium vapor deposition nozzle of the vacuum evaporator shown in FIG. 12.

Next, a procedure for providing lithium to an active material layer of negative electrode 11 is described with reference to FIGS. 12 and 13. FIG. 12 is a schematic configuration view showing a vacuum evaporator for providing a negative electrode with lithium in an Example of the present invention, and FIG. 13 is a conceptual sectional view showing a configuration of a lithium vapor deposition nozzle of the vacuum evaporator of FIG. 12. This device includes copper crucible 24 into which rod heater 23A serving as a heating part is incorporated, lithium vapor deposition nozzle 25, vacuum chamber 20, and vacuum pump 31. Lithium vapor deposition nozzle 25 restricts the movement route of the generated lithium vapor and provides lithium to the surface of negative electrode 11 by using a lithium vapor. Vacuum chamber 20 accommodates negative electrode 11, the heating part and lithium vapor deposition nozzle 25. This device further includes gas nozzle 26 and gas flow controller 27. Gas nozzle 26 opens toward the inside of lithium vapor deposition nozzle 25 and allows gas to flow into the movement route of lithium vapor. Vacuum pump 31 reduces the pressure inside vacuum chamber 20.

Firstly, as shown in FIG. 13, negative electrode 11 is disposed in a manner that it is forwarded from feeding roll 21 in vacuum chamber 20 to winding-up roll 30 via cooling CAN 22 cooled to, for example, 20° C. Then, metallic lithium is placed in copper crucible 24 into which rod heater 23A is incorporated, and lithium vapor deposition nozzle 25 into which rod heater 23B is incorporated is assembled to copper crucible 24. In this state, the pressure inside vacuum chamber 20 is reduced to, for example, $3\times10^{-3}$ Pa. That is to say, the pressure of an atmosphere including negative electrode 11 and a supply source of lithium is reduced. Then, in order to generate lithium vapor, electricity is applied to rod heater 23A to heat lithium 29A that is placed in copper crucible 24 and serves a vapor supplying source. Furthermore, it is preferable that electricity is also applied to rod heater 23B in order to avoid cooling of vapor inside lithium vapor deposition nozzle 25 and depositing of lithium. The temperatures of copper crucible 24 and lithium vapor deposition nozzle 25 are controlled to be, for example, 580° C. by monitoring the temperatures with thermocouple 28. Herein, lithium vapor deposition nozzle 25 limits the movement route of a lithium vapor. The lithium vapor is supplied to negative electrode 11 via lithium vapor deposition nozzle 25, so that an active material layer of negative electrode 11 is provided with lithium. By limiting the movement route of the lithium vapor in this way, the lithium vapor may be supplied to the active material layer efficiently. Then, for example, by adjusting the speed at which negative electrode 11 is forwarded from feeding roll 21 to winding-up roll 30, the amount of lithium to be provided per unit area of negative electrode 11 may be controlled. That is to say, when $SiO_x$ provided with lithium is expressed by $Li_aSiO_x$, the value a in $Li_aSiO_x$ may be controlled.

By changing the value x and the value a in $Li_aSO_x$ variously, eleven kinds of negative electrodes 11 are produced and represented by negative electrode 11 of samples A to K. The combinations of the value x and the value a in samples A to K include: A: (0.2, 0), B: (0.4, 0), C: (0.6, 0), D: (0.6, 1.2), E: (0.5, 1.0), F: (0.4, 0.8), G: (0.2, 1.0), H: (0.2, 0.4), I: (0.1, 0.6), J: (0.1, 0.2), and K: (0.5, 0.2).

On the other hand, positive electrode 10 is produced as follows. Firstly, 10 parts by weight of acetylene black as a conductive agent and 5 parts by weight of polyvinylidene fluoride as a binding agent are mixed with 85 parts by weight of lithium nickelate ($LiNiO_2$) powder. These are dispersed in dehydrated N-methyl-2-pyrrolidone to prepare slurry of a positive electrode mixture material. This positive electrode mixture material is applied to positive electrode current collector 10A made of aluminum foil, dried, then rolled out, and cut into a predetermined dimension. Thus, positive electrode 10 is produced. The thus produced positive electrode active material layer 10B of positive electrode 10 has a density of 3.3 g/cm³ and a thickness of about 56 μm.

On the other hand, 1 wt % vinylene carbonate is added to the mixture solvent containing ethylene carbonate and ethyl methyl carbonate in a volume ratio of 1:3, and furthermore, $LiPF_6$ is dissolved at the concentration of 1.0 mol/L so as to prepare a non-aqueous electrolytic solution.

Next, positive electrode lead 14 made of aluminum is attached to positive electrode current collector 10A, and negative electrode lead 15 made of nickel is attached to negative electrode current collector 11A. Thereafter, positive electrode 10 and negative electrode 11 are interposed onto each other via separator 12 made of polypropylene microporous membrane so as to form an electrode group. At this time, positive electrode active material layer 10B is allowed to face negative electrode active material layer 11B. Then, the electrode group is inserted into outer case 13 in a manner that one ends of positive electrode lead 14 and negative electrode lead 15 are exposed from outer case 13 made of aluminum laminate, and then, the non-aqueous electrolytic solution is injected. Thereafter, the pressure inside outer case 13 is reduced and seals the opening portion of outer case 13 by heat melting. Thus, lithium secondary batteries of samples A to K are completed. Since the capacity density is changed depending upon the value x in $SiO_x$, the thickness of negative electrode active material layer 11B is changed depending upon the capacity of positive electrode 10. Herein, in samples D to J, the charged state of the negative electrode active material is made to be 10% in a completely discharged state of the lithium secondary battery.

The discharge capacity and cycle retention ratio of the thus produced lithium secondary battery are evaluated. In evaluating the discharge capacity, firstly, electric current is made to be 1 CmA and constant-current charge is carried out to end voltage of 4.2 V. Herein, 1 CmA corresponds to an electric current at which the design capacity of positive electrode 10 is charged or discharged for one hour. Thereafter, discharge is carried out in the conditions of 1 CmA and the end voltage of 2.5 V. Next, constant-current charge is carried out in the conditions of 1 CmA and the end voltage of 4.2 V, and then charge is carried out at a constant voltage of 4.2 V until the electric current value is lowered to 0.1 CmA. Then, a constant-current discharge is carried out in the conditions of 1 CmA and the end voltage of 2.5 V. At this time, the discharge capacity is calculated and the ratio thereof with respect to the design capacity of positive electrode 10 is calculated.

Figure 14:
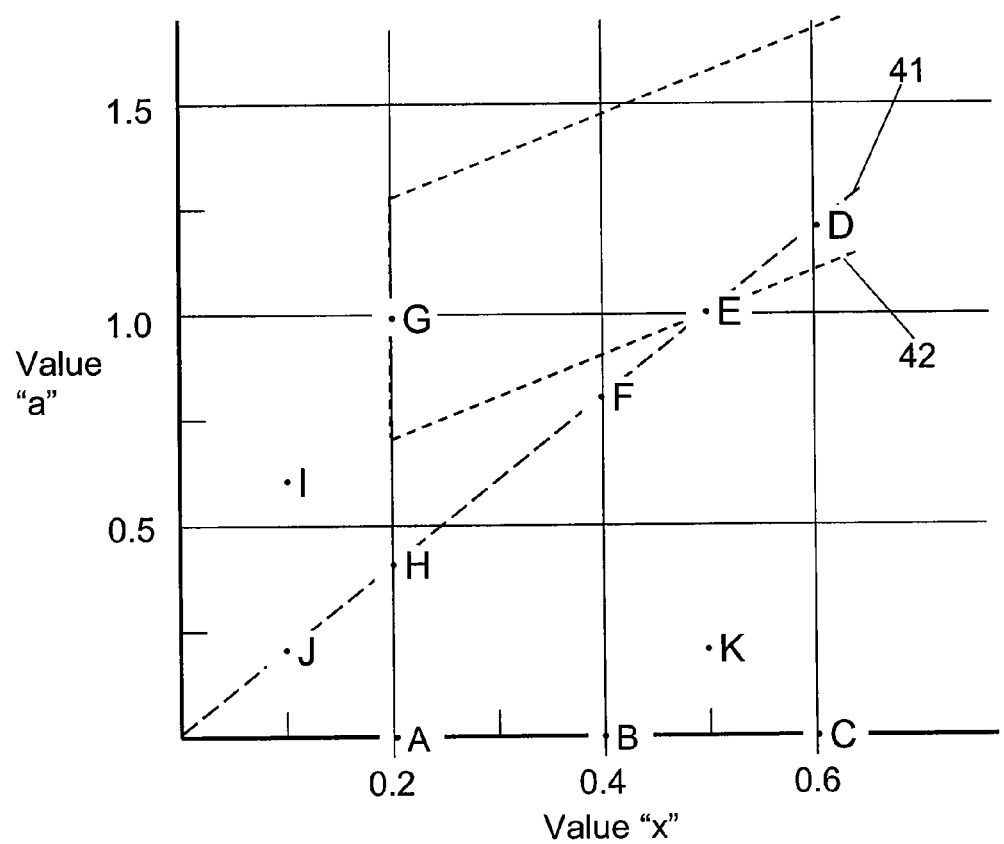
FIG. 14 is a graph showing a value "x" and a value "a" in the negative electrode of each sample in accordance with the specific example of the present invention.

Furthermore, when this discharge capacity is defined as 100%, the capacity retention ratio of the battery after 500 cycles has carried out under the above-mentioned charging and discharging conditions is calculated and the calculated value is defined as a cycle retention ratio. Furthermore, the battery after the cycle test is disassembled and negative electrode 11 is observed. The value x and value a in negative electrode 11 of each sample are shown in FIG. 14, and the obtained results are shown in Table 1, respectively.

TABLE 1

| sample | value x | value a | Discharge capacity ratio (%) | Cycle retention ratio (%) | Disassembled findings |
|---|---|---|---|---|---|
| A | 0.2 | 0 | 98 | 30 | normal |
| B | 0.4 | 0 | 84 | 40 | normal |
| C | 0.6 | 0 | 65 | 50 | normal |
| D | 0.6 | 1.2 | 100 | 81 | normal |
| E | 0.5 | 1.0 | 100 | 80 | normal |
| F | 0.4 | 0.8 | 100 | 78 | normal |
| G | 0.2 | 1.0 | 92 | 75 | somewhat expansion |
| H | 0.2 | 0.4 | 100 | 75 | normal |
| I | 0.1 | 0.6 | 99 | 72 | minor peeling and somewhat expansion |
| J | 0.1 | 0.2 | 100 | 70 | minor peeling |
| K | 0.5 | 0.2 | 82 | 75 | normal |

As is apparent from Table 1, the discharge capacity is small in samples A, B and C. This is because lithium is not provided to negative electrode 11. Therefore, since a stable coating is not formed on active material lump 87, the cycle retention ratio is also small. In sample D on line 41 in FIG. 14, since lithium is provided, the discharge capacity is remarkably increased as compared with sample C. However, since the value x is large, it is necessary to increase the thickness of negative electrode active material layer 11B, and a battery having a sufficient energy density cannot be obtained. Line 41 represents the relation: a=2x.

Samples E, F, H, and J on line 41 show the same discharge capacity. Since the negative electrode active material layer 11B becomes thinner as the value x is smaller, the energy density becomes larger in this order. However, as the value x is smaller, the change in volume of the negative electrode active material associated with charge and discharge is increased. Therefore, the cycle retention ratio is reduced in this order, and the cycle retention ratio in sample J is somewhat small. Furthermore, according to the disassembled finding, minor peeling of negative electrode active material layer 11B is observed.

In sample K having the same value a as that of sample J and the same value x as that of sample E, the cycle retention ratio is in the middle between that of sample J and that of sample E. Furthermore, since sample K has the value a smaller than that of sample E, it has the energy density smaller than sample E, but shows the same level of energy density as that of sample B.

Line 42 is a boundary line of the preferable combination of value x and value a disclosed in WO2007/010922 pamphlet. Sample G is in the boundary line of this preferable range, and sample I is in an extended line of the lower limit line of line 42 and corresponds to value x in sample J. The lower limit line of line 42 shows the relation: a=x+0.5.

Sample G is in a region in which the value x is small, for example, x=0.2. In this region, when lithium is provided until a=1.0 is satisfied, the charge reserve shown in FIG. 4 is also charged at the time of charging. Consequently, the expansion of negative electrode active material layer 11B at the time of charging is increased. As a result, the cycle retention ratio is somewhat lowered.

On the other hand, sample I shows the same level of the discharge capacity and the cycle retention ratio as those of sample J. However, since the amount of lithium to be provided is larger than sample J, similar to sample G, the expansion of negative electrode active material layer 11B at the time of charging is increased. Also, the disassembled finding shows minor peeling in negative electrode active material layer 11B and little bit expansion. Although these samples have smaller value x than that of sample G, the cycle retention ratio is the same level as that of sample G.

Thus, in this Example, in the region in which the value x is small, it is attainable to find more preferable combination of value x and value a as compared with the combination disclosed in WO 2007/010922 pamphlet.

From the above-mentioned results, in a region above line 42 in which $0.1 \leq x \leq 0.5$ is satisfied, that is, when the amount of lithium to be provided is larger than that of line 42, the charge depth is increased and the expansion of active material lump 87 is increased. Therefore, it is assumed that the cycle characteristic is lowered. Furthermore, in a region of a <0.2, in particular, when a is 0, the amount of lithium to be provided is reduced and the expansion of active material lump 87 is reduced, however, a stable coating film is not formed on active material lump 87. Therefore, it is assumed that the cycle characteristic is lowered.

Furthermore, in the range of x<0.1, since the expansion of $SiO_x$ itself constituting active material lump 87 is increased, it is assumed that active material layer 11B tends to peel from current collector 11A and thereby the cycle characteristic is reduced. On the contrary, in the range of x >0.5, the energy density is reduced.

Therefore, when $0.1 \leq x \leq 0.5$ is satisfied in $SiO_x$ and lithium is provided to $SiO_x$ to thus form $Li_aSiO_x$, it is preferable that $0 < a \leq (x+0.5)$ is satisfied. More preferably, $0.2 \leq a \leq (x+0.5)$ is satisfied, and further more preferably, $2x \leq a \leq (x+0.5)$ is satisfied.

Next, the effect of additives is described taken sample H as an example. As shown in Table 1, the cycle retention ratio of sample H is 75%. Samples L, M and N are prepared by adding 2 wt. % of additives to the non-aqueous electrolytic solution of a lithium secondary battery that is the same as sample H. In sample L, vinylene carbonate is added; in sample M, vinyl ethylene carbonate is added; in sample N, fluoroethylene carbonate is added, respectively. When the cycle retention ratios of these samples are evaluated as mentioned above, they are 80%, 77%, and 80%, respectively. In this way, by allowing the additives for improving the viscosity of the coating film of the negative electrode active material to be contained in the lithium secondary battery, the capacity deterioration associated with the charge/discharge cycle may be suppressed.

Note here that in sample H, as mentioned above, in a completely discharged state of the lithium secondary battery, the capacity of negative electrode 11 is selected with respect to positive electrode 10 in a manner that the charged state of the negative electrode active material is 10%. Then, sample P with 2 wt. % addition of vinylene carbonate and sample Q with 2 wt. % addition of fluoroethylene carbonate are prepared in a manner that the charged state of the negative electrode active material is allowed to become 5% in a completely discharged state of the lithium secondary battery by reducing the amount of lithium to be provided. When the cycle retention ratios of samples P and Q are evaluated by the above-mentioned method, both rates are 75%. Thus, when the additive is used, the lower limit of the charged state of the negative electrode active material in a completely discharged state of lithium secondary battery may be lowered while the cycle characteristic is maintained. Therefore, the battery capacity may be increased.

INDUSTRIAL APPLICABILITY

A lithium secondary battery of the present invention includes a positive electrode having a positive electrode active material absorbing and releasing lithium ions, a negative electrode having a negative electrode active material containing at least one element selected from the group consisting of silicon and tin, and a lithium ion conducting electrolyte. In such a lithium secondary battery, the capacities of the positive electrode and negative electrode are selected in a manner that in a completely charged state of the lithium secondary battery charged by a predetermined charging method, the positive electrode active material and the negative electrode active material are in a first partially charged state, respectively, and in a completely discharged state of the lithium secondary battery discharged by a predetermined discharging method, the negative electrode active material is in the second partially charged state. By designing the battery in this way, a lithium secondary battery usable for a long time is provided.

The invention claimed is:
1. A lithium secondary battery, comprising:
a positive electrode having a positive electrode active material for absorbing and releasing a lithium ion;
a negative electrode having a current collector and a negative electrode active material provided on the current collector, the negative electrode active material including at least one of silicon oxide and tin oxide; and
a non-aqueous electrolyte having lithium ion conductivity and being interposed between the positive electrode and the negative electrode,
wherein a completely charged state of the lithium secondary battery is defined by the positive electrode active material and the negative electrode active material charged at a first partially charged level at which the negative electrode active material is in an around 90% charged state,
a completely discharged state of the lithium secondary battery is defined by a second partially charged state at which the negative electrode active material is in an around 10% charged state, and
the negative electrode active material has lithium vapor-deposited thereon to adjust the second partially charged level, wherein an amount of the lithium vapor-deposited on the negative electrode active material is less, by an amount of an irreversible capacity of the positive electrode active material, than an amount necessary to adjust the second partially charged state of the negative electrode active material to the around 10% charged state if the positive electrode active material did not have the irreversible capacity, and
further wherein the negative electrode active material is made mainly of $SiO_x$ ($0.1 \leq x \leq 0.5$), which is made into $Li_a SiO_x$ ($0 < a \leq (x+0.5)$) by vapor-depositing lithium on the negative electrode.

* * * * *